United States Patent
Murray et al.

(10) Patent No.: US 10,404,042 B2
(45) Date of Patent: Sep. 3, 2019

(54) MODULAR POWER DISTRIBUTION TRAVEL SYSTEM

(71) Applicant: KLAS TECHNOLOGIES LIMITED, Dublin (IE)

(72) Inventors: Frank Murray, Dublin (IE); Mark Ryan, Dublin (IE); Enda Sullivan, Dublin (IE)

(73) Assignee: Klas Technologies Limited, Dublin (IE)

(*) Notice: Subject to any disclaimer, the term of this patent is extended or adjusted under 35 U.S.C. 154(b) by 0 days.

(21) Appl. No.: 15/449,366

(22) Filed: Mar. 3, 2017

(65) Prior Publication Data
US 2018/0254616 A1  Sep. 6, 2018

(51) Int. Cl.
| | |
|---|---|
| *H02B 1/52* | (2006.01) |
| *H02B 1/28* | (2006.01) |
| *G06F 1/26* | (2006.01) |
| *H04L 12/24* | (2006.01) |
| *H02J 9/04* | (2006.01) |
| *H04L 12/10* | (2006.01) |
| *A45C 5/14* | (2006.01) |
| *A45C 13/02* | (2006.01) |

(52) U.S. Cl.
CPC .............. *H02B 1/52* (2013.01); *A45C 5/14* (2013.01); *A45C 13/02* (2013.01); *G06F 1/26* (2013.01); *H02B 1/28* (2013.01); *H02J 9/04* (2013.01); *H04L 12/10* (2013.01); *H04L 41/0803* (2013.01)

(58) Field of Classification Search
CPC ..... H02B 1/52; H02B 1/28; H02J 9/04; H04L 41/0803; G06F 1/26; G06F 1/1628; G06F 1/1632
See application file for complete search history.

(56) References Cited

U.S. PATENT DOCUMENTS

| | | | |
|---|---|---|---|
| 8,503,182 B2* | 8/2013 | Petrick ................. | G06F 1/1626 312/223.1 |
| 8,901,879 B2* | 12/2014 | Wang ................... | H02J 7/0044 320/107 |
| 9,300,344 B2* | 3/2016 | Rayner ................. | H01H 13/06 |
| 10,044,205 B1* | 8/2018 | Voelz ................... | H02J 7/0027 |
| 2009/0077375 A1* | 3/2009 | Anspach ............... | H04L 63/029 713/160 |
| 2010/0231161 A1* | 9/2010 | Brown .................. | B25H 3/02 320/101 |
| 2011/0036747 A1* | 2/2011 | Petrick ................. | G06F 1/1628 206/701 |
| 2011/0193524 A1* | 8/2011 | Hazzard ............... | G06F 1/1632 320/114 |
| 2013/0027849 A1* | 1/2013 | Berumen .............. | A45C 11/00 361/679.01 |
| 2013/0146321 A1* | 6/2013 | Takata ................. | H02B 1/28 174/50 |

(Continued)

Primary Examiner — Nidhi Thaker
(74) Attorney, Agent, or Firm — Vorys, Sater, Seymour and Pease LLP

(57) ABSTRACT

A modular power distribution travel system includes a portable outer case and a chassis disposed inside the portable outer case. The chassis includes a plurality of slots for receiving and storing a plurality of removable computing modules. The modular power distribution travel system further includes a power system for providing power distribution to the plurality of modules.

20 Claims, 8 Drawing Sheets

(56) References Cited

U.S. PATENT DOCUMENTS

2014/0192481 A1* 7/2014 Wojcik ................. H05K 5/0086
                                                                      361/679.55
2015/0177797 A1* 6/2015 Butzer ...................... G06F 1/26
                                                                      713/300

* cited by examiner

MODULAR POWER DISTRIBUTION TRAVEL SYSTEM

BACKGROUND

Computing systems and networks, including communications networks, and data storage networks, are often relied on by individuals, teams, and organizations for a variety of applications. For example, computing system or a communication network may be relied on by military personnel while carrying on field operations. In addition, such networks and computing systems may be relied on in a variety of settings. For example, a communication network may be needed by military personal in the middle of a desert. Moreover, such computing systems may be relied on for continuous operations, regardless of availability of a power supply in the field or in such various settings.

Existing computing systems and networks, however, may not have the portability and flexibility needed for serving such a variety of applications in a variety of settings, even when a power source may not be available.

SUMMARY

A modular power distribution travel system includes a portable outer case and a chassis disposed inside the portable outer case. The chassis includes a plurality of slots for receiving and storing a plurality of removable computing modules. The modular power distribution travel system further includes a power system for providing power distribution to the plurality of modules.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
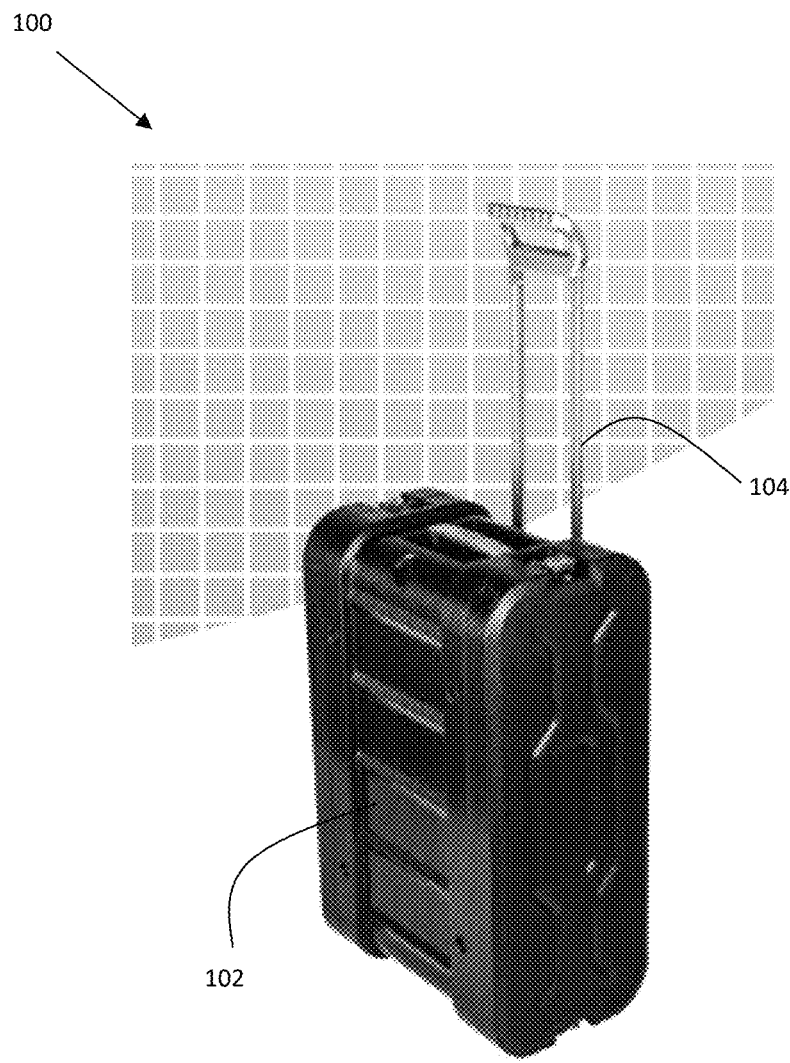
FIG. 1 illustrates an example modular power distribution travel system.

FIG. 1 illustrates an example modular power distribution travel system 100 for storing and transporting various computer hardware, networking, and communications modules, such as routers and switches, computer servers, and data storage modules, for example. It should be appreciated that modular power distribution travel system 100 may be used to store and transport other suitable modules.

The modular power distribution travel system 100 includes an outer case 102 for protecting the stored modules (not shown) from external elements as well as for providing structure for the travel system 100. The outer case 102 may be any suitable material. It should be appreciated that a material that is light weight and portable but that also provides adequate protection and structure may be desirable. In one example, the outer case 102 may be made of carbon fiber. In one example, the outer case 102 is hybridized with glass on the inside surface.

In one example, the modular power distribution travel system 100, and in turn the outer case 102, may be constructed in such a form that is suitable for airline carry-on. For example, the modular power distribution travel system 100 may have dimensions less than or equal to the maximum dimensions allowed for a bag to be able to fit inside an overhead bin or on under a seat on an airline.

Figure 2:
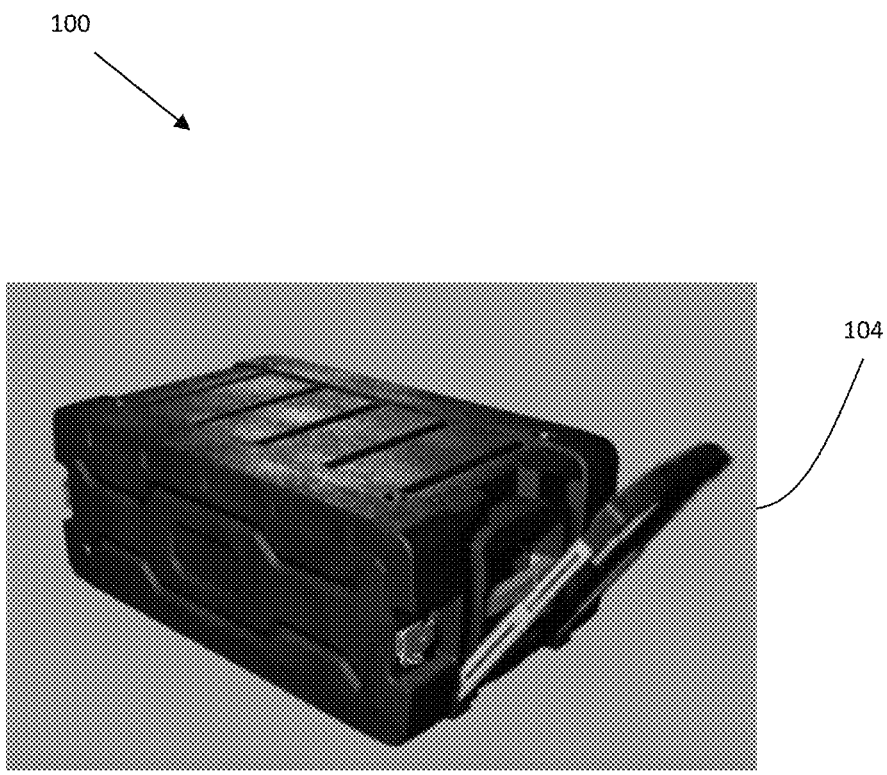
FIG. 2 illustrates an example modular power distribution travel system with a handle.

In one example, to facilitate mobility, the modular power distribution travel system 100, includes a handle 104 and wheels (not shown). The handle 104 may be adjustable in length in order to accommodate users of varying heights and arm lengths. In one example, as illustrated in FIG. 2, the handle 104 can fold in and be stored up against the outer case 102 when not being used.

Figures 3A, 3B:
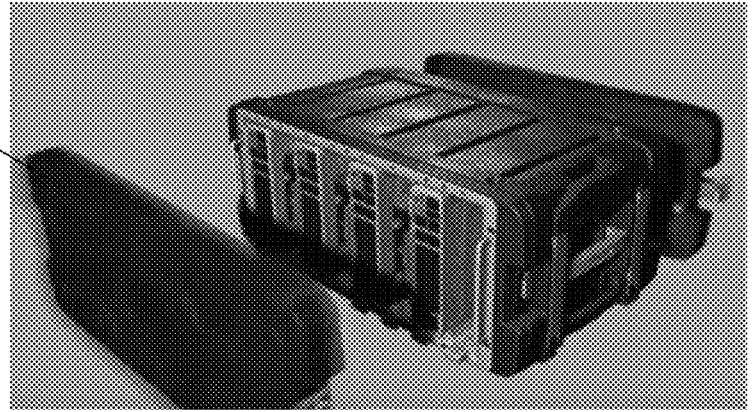
FIG. 3A illustrates an example modular power distribution travel system with removable side panels.
FIG. 3B illustrates an example modular power distribution travel system with removable side panels.

In order to enable access to the internal components of the modular power distribution travel system 100, one or more latches 302 or latching-type mechanisms, as illustrated in FIG. 3A, can be opened or unlocked in order to release the side panels 304. Releasing the side panels 304, as illustrated in FIG. 3B, in addition to opening access to the inside of the system 100, facilitates airflow through the system 100 so that the internal components of the system 100 may be cooled.

In one example, the side panels 304 include o-ring seals (not shown) or other suitable types of seals around the edges to facilitate a secure seal and to help prevent external elements from entering into the modular power distribution travel system 100 and potentially damaging the internal components. In one example, the modular power distribution travel system 100 further includes an automatic pressure equalization valve (not shown) to ensure proper pressure inside and to further help prevent the internal components from being damaged.

Figure 4:
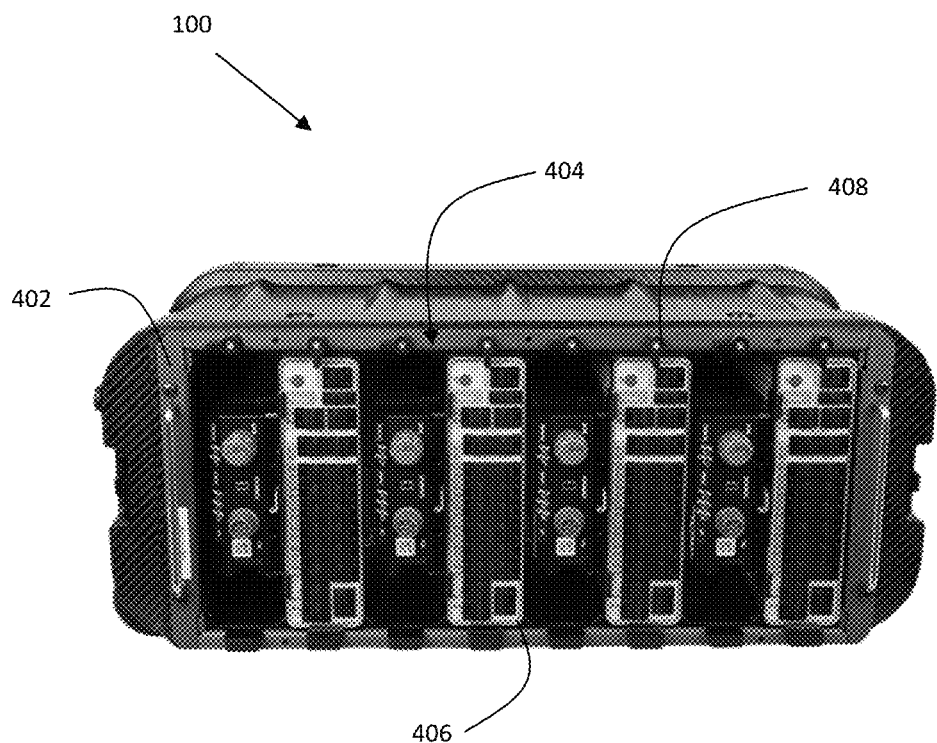
FIG. 4 illustrates an example chassis of an example modular power distribution travel system.

FIG. 4 illustrates the modular power distribution travel system 100 wherein a side panel 304 has been removed in order to reveal the internals of the modular power distribution travel system 100. The modular power distribution travel system 100 further includes a chassis 402, internal to the outer case 102. The chassis 402 has multiple slots or openings 404 for receiving and storing a module 406. A module 406 can be any suitable computer hardware, networking, or communications module. It should be appreciated that although the example modular power distribution travel system 100 is depicted as including 8 module slots 404, the modular power distribution travel system 100 may include any suitable number of module slots 404.

Figure 5:
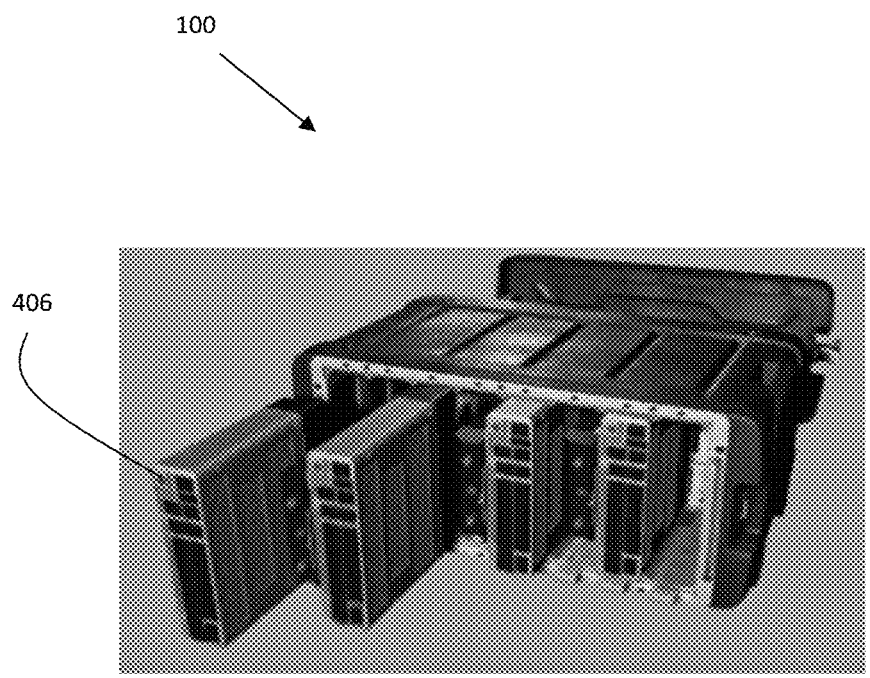
FIG. 5 illustrates an example chassis with removable modules.

It should be appreciated that the modules 406 are removable, as illustrated in FIG. 5, and therefore the chassis 402 may be populated with any suitable number and combination of modules 406 as applicable for a given application or environment. For example, the modules 406 may be configured to form a communications network.

Referring again to FIG. 4, in one example, the chassis 402 includes one or more rotatable pins 408 or other suitable locking mechanisms for securing the modules 406 into the slots 404 and preventing the modules 406 from sliding out when the pins 408 are in a closed position.

In one example, the modular power distribution travel system 100 provides power distribution to the modules 406 via an onboard power system (not shown). The power system may provide power via either an internal or an external power source. For example, the power system includes an onboard power supply (not shown) that is configured to receive power from an external source in order to provide power to the modules 406. In one example, the power system includes an onboard uninterruptable power supply (not shown) for providing power to the onboard power supply. Thus, the system 100 may be configured to provide continuous power distribution to the modules 406 in a variety of settings, regardless of the availability of an external power source. The power distribution may be provided in either AC or DC form as suitable. It should be appreciated that the modules 406 are independently battery backed and therefore the status and availability of one module doesn't impact the status and availability of a second module.

Figure 6:
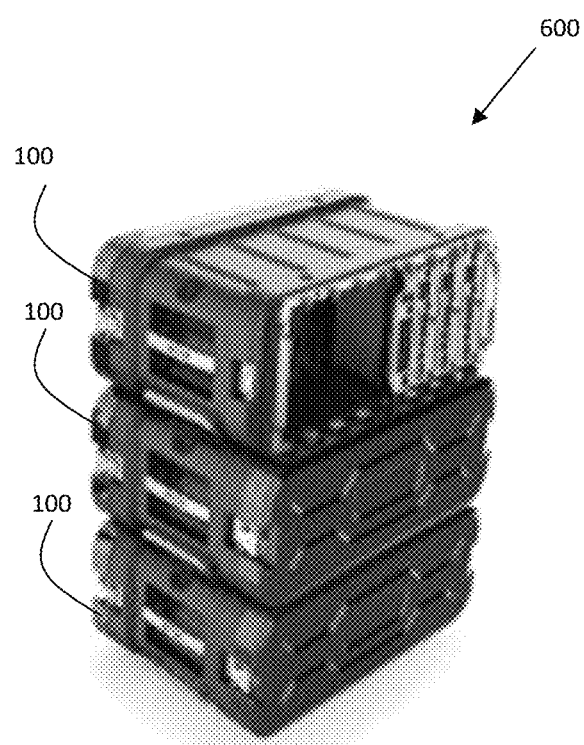
FIG. 6 illustrates an example of stackable modular power distribution travel systems.

In one example, as illustrated in FIG. 6, one or more modular power distribution travel systems 100 may be stacked on top of each other, thus forming a scalable and expandable system 600 of modular power distribution travel systems 100. It should be appreciated that a modular power distribution travel system 100 may include any suitable grooves, channels, locking mechanisms, and so on to facilitate such stacking.

Figure 7:
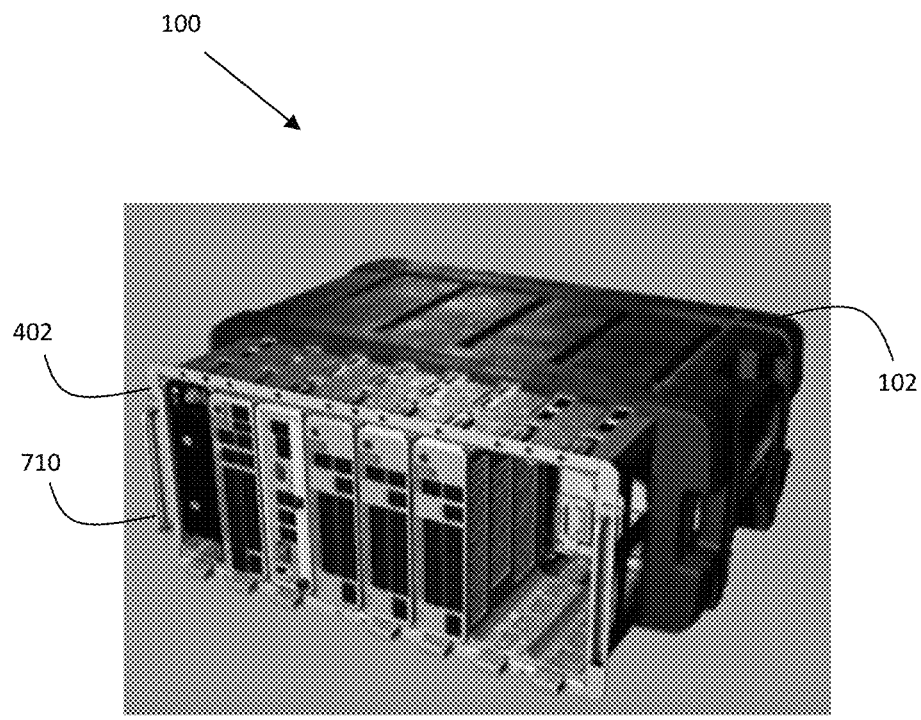
FIG. 7 illustrates an example of a removable chassis.

In one example, as illustrated in FIG. 7, the chassis 402 may be removable from the outer case 102 of the modular power distribution travel system 100. In one example, the chassis 402 further includes one or more handles 710 to facilitate handling of the chassis 402 and removing the chassis 402 from the outer case 102. The handles 710 may be constructed of any suitable material. In one example, the handles 710 are milled aluminum.

Figure 8:
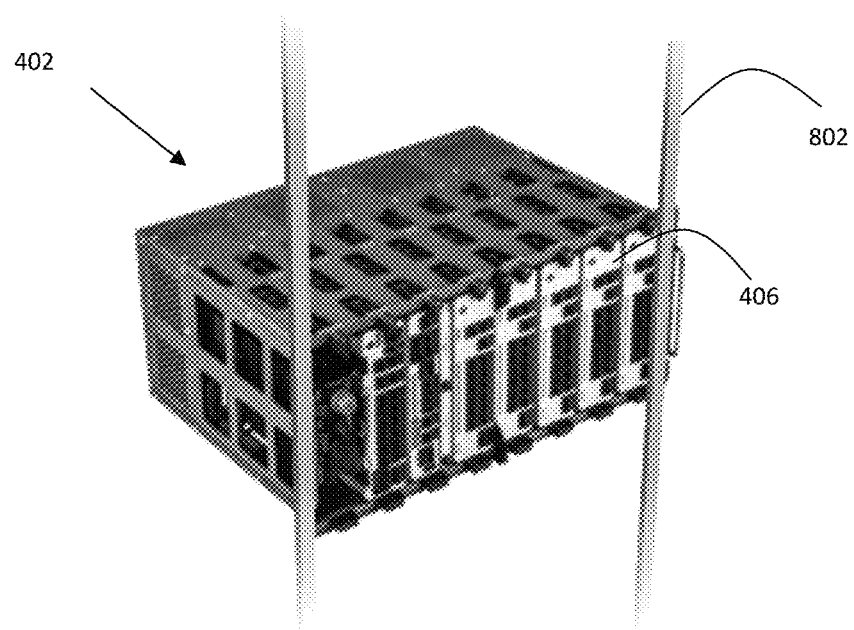
FIG. 8 illustrates an example of a rack-mountable chassis.

A removable chassis 402 enables a more flexible system 100. For example, as illustrated in FIG. 8, once removed, a chassis 402 may be mounted onto a standard rack 802. Thus, in addition be being portable, the modules 406 may also be located in a more fixed location such as a computer data center, for example.

It should be appreciated that the modular power distribution travel system 100 may be used in a variety of applications. For example, the system 100 may be used for local data storage and computing. Specifically, the system 100 may be used to deploy enterprise-grade, high density computing and storage capabilities to tactical environments so that users can bring datacenter applications and services to the field without having to rely on faulty backhaul and limited bandwidth. In another example, the system 100 may provide tactical radio integration. In particular, the systems 100 power capabilities enable tactical radios to be charged and powered and removed without interrupting operation.

In another example, the modular power distribution travel system 100 may be used to transport a fully mobile version of a Commercial Solutions for Classified system, including an inner and outer tunnel represented by a red-side router and a black-side router as well as suitable encryption mechanisms for complying with government security standards for secure communications.

Other suitable features and applications of the system 100 include, for example, routing and switching, VoIP, server virtualization, WAN acceleration, data storage, and satellite, terrestrial, and cellular backhaul.

While example systems, methods, and so on have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim.

Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

The invention claimed is:

1. A modular power distribution travel system comprising:
   a portable outer case;
   a removable chassis disposed inside the portable outer case, comprising a plurality of slots for receiving and storing a plurality of removable computing modules, wherein the chassis is rack-mountable on a standard rack; and
   a power system for providing power distribution to the plurality of modules.

2. The modular power distribution travel system of claim 1, wherein a combination of the plurality of computing modules is configured to form a communications system.

3. The module power distribution travel system of claim 1, wherein a combination of the plurality of computing modules is configured to implement a mobile version of a Commercial Solutions for Classified system, comprising an inner and outer tunnel represented by a red-side router and a black-side router, and an encryption mechanism for complying with government security standards for secure communications.

4. The modular power distribution travel system of claim 1, wherein the portable outer case comprises a handle and a plurality of wheels for facilitating mobility.

5. The modular power distribution travel system of claim 1, wherein the portable outer case comprises dimensions less than or equal to the maximum dimensions allowed for an airline carry-on bag.

6. The modular power distribution travel system of claim 1, wherein the portable outer case comprises a carbon fiber case.

7. The modular power distribution travel system of claim 1, wherein the portable outer case comprises a hybridized construction with glass on the inside surface.

8. The modular power distribution travel system of claim 1, wherein the portable outer case comprises a first removable side and a second removable side opposite the first removable side for facilitating airflow through the modular power distribution travel system.

9. The modular power distribution travel system of claim 8, wherein the first removable side and the second removable side comprise o-ring seals.

10. The modular power distribution travel system of claim 8, further comprising a latching mechanism to enable first and second removable sides to be removed.

11. The modular power distribution travel system of claim 1, further comprising an automatic pressure equalization valve.

12. The modular power distribution travel system of claim 1, wherein the power system comprises a power supply configured to provide power distribution in the form of AC power.

13. The modular power distribution travel system of claim 1, wherein the power system comprises a power supply configured to provide power distribution in the form of DC power.

14. The modular power distribution travel system of claim 1, wherein the power system comprises a power supply configured to receive power from an external power source.

15. The modular power distribution travel system of claim 1, wherein the power system comprises a power supply configured to receive power from an onboard uninterruptable power source.

16. The modular power distribution travel system of claim 1, wherein the chassis comprises a plurality of locking mechanisms for securing the plurality of modules.

17. The modular power distribution travel system of claim 1, wherein the portable outer case is configured to be stackable with a second portable outer case of a second modular power distribution travel system.

18. The modular power distribution travel system of claim 1, wherein the removable chassis comprises one or more handles to facilitate removing the removable chassis from the portable outer case.

19. A modular power distribution travel system comprising:
a portable outer case;
a chassis disposed inside the portable outer case, comprising a plurality of slots for receiving and storing a plurality of removable computing modules, wherein the chassis is rack-mountable on a standard rack; and
a power system for providing power distribution to the plurality of modules,
wherein the portable outer case comprises a first removable side and a second removable side opposite the first removable side, the first removable side and the second removable side facilitating airflow through the modular power distribution travel system and for accessing the plurality of removable computing modules.

20. A modular power distribution travel system comprising:
a portable outer case;
a chassis disposed inside the portable outer case, comprising a plurality of slots for receiving and storing a mobile version of a Commercial Solutions for Classified (CSfC) system, the CSfC system comprising an inner and outer tunnel represented by a red-side router and a black-side router, and an encryption mechanism for complying with government security standards for secure communications, wherein the chassis is rack-mountable on a standard rack such that the CSfC system can be used with other rack-mounted equipment; and
a power system for providing power distribution to the plurality of modules.

* * * * *